US012803025B2

(12) United States Patent
Wang et al.

(10) Patent No.: US 12,803,025 B2
(45) Date of Patent: Nov. 17, 2026

(54) FUEL CELL SYSTEM HAVING STACK VOLTAGE CONTROL BASED FREEZE STARTUP STRATEGY

(71) Applicant: Ford Global Technologies, LLC, Dearborn, MI (US)

(72) Inventors: Hao Wang, Ann Arbor, MI (US); Zeng Qiu, Ann Arbor, MI (US); Matthew Riley, Ann Arbor, MI (US); Ryan Ma, Canton, MI (US); Michiel J. Van Nieuwstadt, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 663 days.

(21) Appl. No.: 18/348,604

(22) Filed: Jul. 7, 2023

(65) Prior Publication Data

US 2025/0015327 A1 Jan. 9, 2025

(51) Int. Cl.

| | |
|---|---|
| ***H01M 8/0432*** | (2016.01) |
| ***B60L 58/32*** | (2019.01) |
| ***H01M 8/04701*** | (2016.01) |
| ***H01M 8/04746*** | (2016.01) |
| ***H01M 8/04791*** | (2016.01) |
| ***H01M 8/04858*** | (2016.01) |
| *H01M 8/10* | (2016.01) |

(52) U.S. Cl.

CPC ......... *H01M 8/04798* (2013.01); *B60L 58/32* (2019.02); *H01M 8/0432* (2013.01); *H01M 8/04731* (2013.01); *H01M 8/04753* (2013.01); *H01M 8/0488* (2013.01); *H01M 2008/1095* (2013.01); *H01M 2250/20* (2013.01)

(58) Field of Classification Search

CPC .. H01M 8/04; H01M 8/04798; H01M 8/0432; H01M 8/04791

See application file for complete search history.

(56) References Cited

U.S. PATENT DOCUMENTS

| | | | | |
|---|---|---|---|---|
| 7,971,538 | B1 | 7/2011 | Miller et al. | |
| 8,715,873 | B2 | 5/2014 | Limbeck | |
| 9,034,532 | B2 | 5/2015 | Sung et al. | |
| 9,583,774 | B2 | 2/2017 | Boegershausen et al. | |
| 10,249,890 | B2 | 4/2019 | Procter et al. | |
| 10,446,862 | B2 | 10/2019 | Arisetty et al. | |
| 11,201,341 | B2 | 12/2021 | Farhat et al. | |
| 2001/0028967 | A1* | 10/2001 | Roberts ............ | H01M 8/04589 429/432 |
| 2008/0199743 | A1* | 8/2008 | Sederquist ........ | H01M 8/04141 429/413 |
| 2015/0288007 | A1 | 10/2015 | Gangwar et al. | |

(Continued)

FOREIGN PATENT DOCUMENTS

| | | | |
|---|---|---|---|
| DE | 60005836 | T2 | 5/2004 |

*Primary Examiner* — Kenneth J Douyette

(74) *Attorney, Agent, or Firm* — David B. Kelley; Brooks Kushman P.C.

(57) ABSTRACT

A system includes a fuel cell stack and a controller. The controller is configured to operate the fuel cell stack with a given air stoic ratio while a temperature of the fuel cell stack is greater than a temperature threshold and to operate the fuel cell stack with a lower air stoic ratio, to thereby suppress a stack voltage of the fuel cell stack in order to increase heat generation of the fuel cell stack, while the temperature of the fuel cell stack is lower than the temperature threshold.

17 Claims, 5 Drawing Sheets

(56) References Cited

U.S. PATENT DOCUMENTS

| | | | | |
|---|---|---|---|---|
| 2016/0006059 | A1* | 1/2016 | Kwon | B60L 58/40 429/442 |
| 2017/0263954 | A1 | 9/2017 | Shaikh et al. | |

* cited by examiner

FUEL CELL SYSTEM HAVING STACK VOLTAGE CONTROL BASED FREEZE STARTUP STRATEGY

STATEMENT REGARDING FEDERALLY SPONSORED RESEARCH OR DEVELOPMENT

The present disclosure was made with Government support under Contract No. DE-EE0009858 awarded by the Department of Energy (DOE). The Government has certain rights to the present disclosure.

TECHNICAL FIELD

The present disclosure relates to methods and systems for controlling a fuel cell system of a vehicle.

BACKGROUND

A fuel cell is an electrochemical device that converts chemical energy of a fuel, e.g., hydrogen, and an oxidizing agent, e.g., oxygen, into electrical energy, with water as a byproduct. A fuel cell stack is a connected group of fuel cells. A fuel cell system including one or more fuel cell stacks may be used in a vehicle to provide electrical power for vehicle propulsion.

SUMMARY

A system includes a fuel cell stack and a controller. The controller is configured to operate the fuel cell stack with a given air stoic ratio while a temperature of the fuel cell stack is greater than a temperature threshold and to operate the fuel cell stack with a lower air stoic ratio, to thereby suppress a stack voltage of the fuel cell stack and increase heat generation of the fuel cell stack, while the temperature of the fuel cell stack is lower than the temperature threshold.

The controller may adjust the lower air stoic ratio according to a difference between the stack voltage of the fuel cell stack and a desired stack voltage of the fuel cell stack.

The controller may adjust a stack current of the fuel cell stack in order to operate the fuel cell stack with the lower air stoic ratio.

The controller may adjust a stack current of the fuel cell stack in order to operate the fuel cell stack with an air stoic ratio greater than the lower air stoic ratio while the stack voltage is lower than a voltage threshold. The voltage threshold may be a low-side voltage limit of a DC/DC converter configured to receive the stack voltage from the fuel cell stack.

The controller may adjust a mass air flow into the fuel cell stack in order to operate the fuel cell stack with the lower air stoic ratio.

The controller may operate the fuel cell stack with the lower air stoic ratio while the temperature of the fuel cell stack is lower than the temperature threshold and while the stack voltage of the fuel cell stack is lower than a freeze voltage threshold.

The given air stoic ratio may be at least 1.75 and the lower air stoic ratio may be less than 1.5. The lower air stoic ratio may be less than 1.5 and greater than 1.0.

A vehicle includes a fuel cell stack and a controller. The controller is configured to, while a temperature of the fuel cell stack is less than a temperature threshold, operate the fuel cell stack with a selected air stoic ratio, that is lower than an air stoic ratio used to operate the fuel cell stack when the temperature is greater than the temperature threshold, to thereby suppress a stack voltage in order to maximize the stack internal heat generation of the fuel cell stack while the temperature of the fuel cell stack is less than the temperature threshold.

The vehicle may further include a traction battery configured to provide a battery electrical power for vehicle propulsion with the fuel cell stack being configured to provide a fuel cell stack electrical power dependent on the stack voltage for vehicle propulsion.

A method for a vehicle having a fuel cell stack includes operating the fuel cell stack with a given air stoic ratio while a temperature of the fuel cell stack is greater than a temperature threshold and operating the fuel cell stack with a lower air stoic ratio, to thereby suppress a stack voltage in order to maximize the stack internal heat generation of the fuel cell stack, while the temperature of the fuel cell stack is lower than the temperature threshold.

DETAILED DESCRIPTION

Detailed embodiments of the present disclosure are disclosed herein; however, it is to be understood that the disclosed embodiments are merely exemplary of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
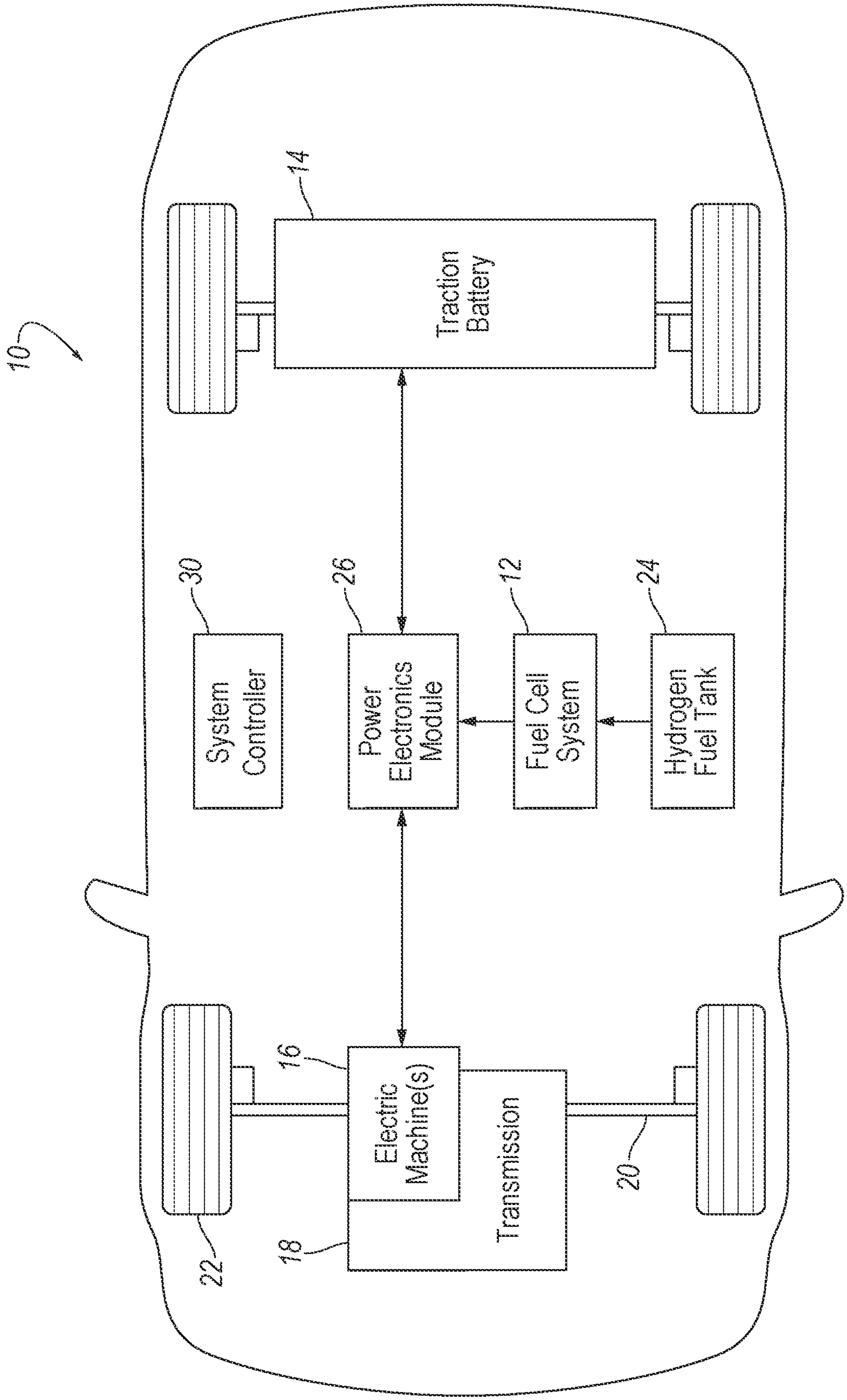
FIG. 1 illustrates a block diagram of an exemplary fuel cell electric vehicle (FCEV) having a fuel cell system (FCS) and a traction battery both for providing electrical power to an electric machine of the FCEV for vehicle propulsion, the FCS having a fuel cell stack comprised of a connected group of fuel cells.

Referring now to FIG. 1, a block diagram of an exemplary fuel cell electric vehicle (FCEV) 10 having a fuel cell system (FCS) 12 and a traction battery 14 is shown. FCS 12 and traction battery 14 are individually operable for providing electrical power for propulsion of FCEV 10.

FCEV 10 further includes one or more electric machines 16 mechanically connected to a transmission 18. Electric machine 16 is capable of operating as a motor and as a generator. Transmission 18 is mechanically connected to a drive shaft 20 mechanically connected to wheels 22 of FCEV 10. Electric machine 16 can provide propulsion and slowing capability for FCEV 10. Electric machine 16 acting as a generator can recover energy that may normally be lost as heat in a friction braking system.

FCS 12 is configured to convert hydrogen from a hydrogen fuel tank 24 of FCEV 10 into electrical power. Electrical power from FCS 12 is for use by electric machine 16 for propelling FCEV 10. FCS 12 is electrically connected to electric machine 16 via a power electronics module 26 of FCEV 10. Power electronics module 26, having an inverter or the like, provides the ability to transfer electrical power from FCS 12 to electric machine 16. For example, FCS 12 provides high-voltage (HV) direct current (DC) electrical power while electric machine 16 may require three-phase alternating current (AC) electrical power to function. Power electronics module 26 converts the electrical power from FCS 12 into electrical power having a form compatible for operating electric machine 16. In this way, FCEV 10 is configured to be propelled with use of electrical power from FCS 12.

Traction battery 14 stores electrical energy for use by electric machine 16 for propelling FCEV 10. Traction battery 14 is also electrically connected to electric machine 16 via power electronics module 26. Power electronics module 26 provides the ability to bi-directionally transfer electrical power between traction battery 14 and electric machine 16. For example, traction battery 14 also provides HV DC electrical power while electric machine 16 may require the three-phase AC electrical power to function. Power electronics module 26 converts the electrical power from traction battery 14 into electrical power having the form compatible for operating electric machine 16. In this way, FCEV 10 is further configured to be propelled with the use of electrical power from traction battery 14.

Further, in a regenerative mode, power electronics module 26 converts AC electrical power from electric machine 16 acting as a generator to the DC electrical power form compatible with traction battery 14. Similarly, traction battery 14 may receive electrical power from FCS 12 via power electronics module 26. For instance, when FCS 12 is providing electrical power for propelling FCEV 10, any excess electrical power from the FCS not used in propelling the FCEV may be received by traction battery 14 via power electronics module 26.

FCS 12 and traction battery 14 may have one or more associated controllers to control and monitor the operation thereof. The controllers can be microprocessor-based devices. The controllers may communicate via a serial bus (e.g., Controller Area Network (CAN)) or via discrete conductors.

For example, a vehicle system controller (VSC) 30 is configured to coordinate the operation of FCS 12 and traction battery 14 in providing electrical power for propulsion of FCEV 10 and may be further configured to control the FCS and/or the traction battery accordingly. Vehicle system controller 30 ("controller") can be considered as being one controller or multiple individual controllers for controlling FCS 12 and traction battery 14.

In operation for propelling FCEV 10, controller 30 interprets and splits a driver demand for propelling FCEV 10 into an FCS power request and a traction battery power request. In turn, FCS 12 is controlled to output electrical power commensurate with the FCS power request to electric machine 16 for use in propelling FCEV 10. (More particularly, FCS 12 outputs a "net" electrical power commensurate with the FCS power request. Hence, FCS 12 is controlled to generate a "gross" electrical power equal to a summation of the net electrical power and an auxiliary load expended by the FCS in generating the electrical power.) Likewise, traction battery 14 is controlled to output electrical power commensurate with the traction battery power request to electric machine 16 for use in propelling FCEV 10.

FCS 12 includes one or more fuel cell stacks (not shown). Each fuel cell stack is comprised of a plurality of fuel cells (e.g., proton-exchange membrane fuel cells) electrically connected (usually) in series. FCS 12 further includes various auxiliary equipment such as an electric compressor for FCS air supply.

For simplicity, FCS 12 is described herein as having one fuel cell stack (or "stack") having fuel cells connected in series. As the fuel cells of the fuel cell stack are connected in series, (i) the voltage of the fuel cell stack ("stack voltage") is a summation of the voltages of the fuel cells and (ii) each fuel cell has the same current and the current of the fuel cell stack ("stack current") is the same as the current of each of the fuel cells. Hence, the electrical power delivered by FCS 12 is equal to the stack voltage multiplied by the stack current.

Further, for a fuel cell, the voltage of the fuel cell depends inversely on the current of the fuel cell. The voltage of the fuel cell further depends on other factors including cell temperature, membrane humidity, pressure, anode hydrogen density, air flow rate, and the like.

Figure 2:
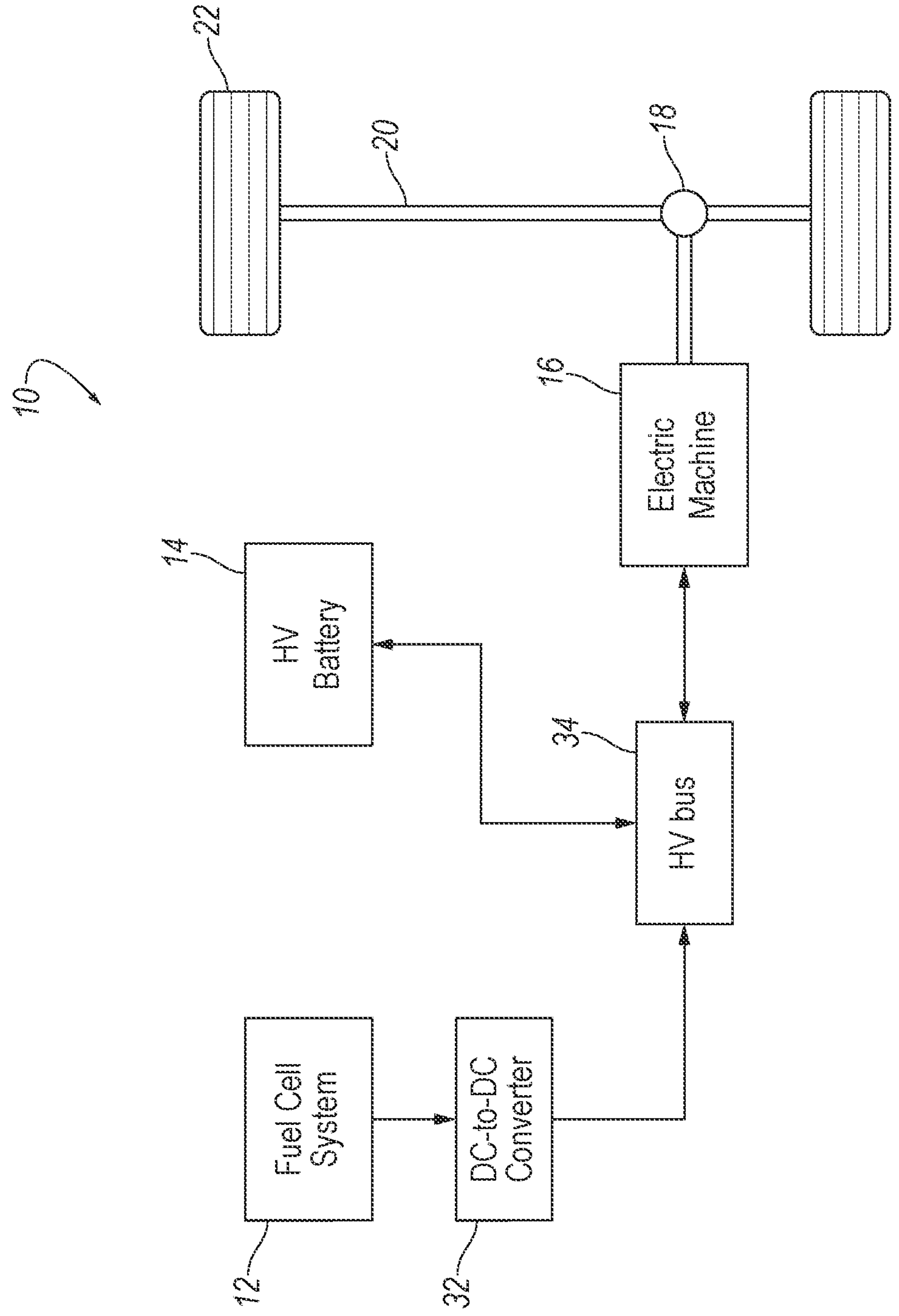
FIG. 2 illustrates another block diagram of the FCEV depicting further detail of the electrical interconnection between the FCS, the traction battery, and the electric machine.

Referring now to FIG. 2, with continual reference to FIG. 1, another block diagram of FCEV 10 depicting further detail of the electrical connection between FCS 12, traction battery 14, and electric machine 16 is shown. As noted above, and as shown in FIG. 1, FCS 12, traction battery 14, and electric machine 16 are electrically connected via power electronics module 26. In further detail, as shown in FIG. 2, power electronics module 26 includes a DC/DC converter 32 and FCEV 10 further includes a HV bus 34. FCS 12 is electrically connected to HV bus 34 via DC/DC converter 32. Traction battery 14 and electric machine 16 are directly electrically connected to HV bus 34.

DC/DC converter 32 is operable to boost the voltage (i.e., the stack voltage) of the electrical power provided by FCS 12. DC/DC converter 32 provides the boosted stack voltage to HV bus 34 in order to coordinate with traction battery 14 in supplying electrical power for propelling FCEV 10. For DC/DC converter 32 to be able to boost the stack voltage to a voltage level of HV bus 34 compatible with traction battery 14, the stack voltage has to be greater than a low-side voltage limit of the DC/DC converter. If the stack voltage is less than the low-side voltage limit of DC/DC converter 32, then FCEV 10 will be unable to be propelled with use of electrical power from FCS 12.

A consideration for FCS 12 is its freeze startup (FSU) capability. In relatively extremely cold ambient (e.g., −30 °C), a successful startup of FCS 12 requires producing electrical power and leveraging waste heat generated from the electrical power production to warm up the fuel cell stack of the FCS. However, as noted above, water is generated as a byproduct of the electrical power production. As such, as water is generated during the freeze startup, there may be ice formation inside the fuel cell stack. The ice formation may cover the catalyst layer or block the flow channels associated with the fuel cell stack. When such conditions occur, the ability of the fuel cells to perform the electrochemical reaction may be hindered. This may lead to a sudden drop in the stack voltage and a stalled startup when the stack voltage drops below the low-side voltage limit of DC/DC converter 32.

Therefore, during freeze startup of FCS 12, it is desirable for the FCS to generate waste heat fast enough to warm up the FCS and melt generated ice prior to the amount of ice being excessive. Waste heat generation positively correlates with the amount of electrical power produced by FCS 12. Thus, FCS 12 has to produce a relatively large amount of electrical power in order to generate a sufficient amount of waste heat. Traction battery 14 is to absorb electrical power produced by FCS 12 that is not used in propelling FCEV 10 and that is not lost as waste heat. However, traction battery 14 is also subject to the extremely cold ambient (e.g., −30 °C) and consequently has a limited charging rate. The limited charging rate may prevent traction battery 14 from being able to absorb excess electrical power generated by FCS 12.

In accordance with the present disclosure, controller 30 implements a stack voltage control based freeze startup strategy for FCS 12. The stack voltage control based freeze startup strategy (i.e., "the proposed freeze startup strategy" or "the proposed FSU stack voltage control") is based on controlling the stack voltage to enable robust freeze startup of FCS 12. Controller 30 implements the proposed freeze startup strategy for FCS 12 such as after FCEV 10 is cold-soaked in relatively extremely cold ambientes. The proposed freeze startup strategy handles the noted FCEV constraints in practical applications including the voltage lower limit of DC/DC converter 32 and the charging limit of traction battery 14 in cold conditions.

A principle of the proposed freeze startup strategy is the idea of operating FCS 12 in a low air stoic (stoichiometric) mode to thereby suppress the stack voltage. In further detail, per the proposed freeze startup strategy, the average air stoic ($\lambda_{stoic}$) ratio inside the fuel cell stack of FCS 12 is defined by the following equation:

$$\lambda_{stoic} = \left(W_{air}^{in} * X_{O_2} * 4F\right)/\left(I_{st} * N_{cell} * M_{O_2}\right) \tag{1}$$

$$W_{air}^{in}$$

represents the mass air flow (MAF) into the fuel cell stack (in kg/s); $I_{st}$ represents the stack current (in A); $X_{O_2}$, $M_{O2}$, $N_{cell}$, and F represent the oxygen mole fraction of the air, oxygen molar mass, number of cells inside the fuel cell stack, and the Faraday constant, respectively.

Unlike normal operation when the $\lambda_{stoic}$ ratio is often greater than 1.75, during the freeze startup of FSU 12 per the proposed freeze startup strategy controller 30 leverages the operation of the $\lambda_{stoic}$ ratio (typically) lower than 1.5, which is referred to as low air stoic mode. In such an operating condition, the stack voltage can be suppressed in order to increase waste heat generation (i.e., in order to maximize heat generation internal to the fuel cell stack), where the stack voltage ($v_{st}$) can be characterized by the following equations:

$$v_{st} = \Sigma_{i=1,2,\ldots N_{cell}} E_{cell}^{i} = \Sigma_{i=1,2,\ldots N_{cell}}\left(E_{ocv}^{i} - E_{loss}^{i}\right) \tag{2}$$

-continued $$E_{ocv}^{i} = 1.229 - \left(0.85 * 10^{-3} * \left(T_{fc}^{i} - 298.15\right)\right) + \left(4.3085 * 10^{-5} * T_{fc}^{i} * \left(\ln\left(p_{H2}^{i}\right) + \frac{1}{2}\ln\left(p_{O2}^{i}\right)\right)\right) \tag{3}$$

$$E_{ocv}^{i}$$

represents the open circuit voltage (OCV) of the ith fuel cell;

$$T_{fc}^{i},\ p_{H2}^{i},\text{ and } p_{O2}^{i}$$

represent the temperature, the partial pressure of $H_2$ on the anode side, and the partial pressure of $O_2$ on the cathode side for the ith fuel cell, respectively;

$$E_{loss}^{i}$$

characterizes the average loss in OCV of the ith fuel cell, which accounts for activation loss, ohmic loss, and density loss.

There are typically hundreds of fuel cells inside the fuel cell stack and cell-to-cell variations in their terminal voltages ($E_{cell}$) can be dramatic during freeze startup of FCS 12. Therefore, it is impractical to manage the cell voltage for each individual fuel cell. Instead, assuming a positive correlation on average between $$\lambda_{stoic}\text{ and } p_{O2}^{i},$$

the proposed freeze startup strategy targets at managing the stack voltage via the changes in the average air stoic. In low air stoic mode, the stack voltage can be suppressed to be significantly lower than normal operation. Thus, with such a suppressed stack voltage, when drawing the same stack current with the same amount of consumed $H_2$, there is much lower output electrical power produced by FCS 12 and more energy is converted into waste heat. The lower electrical power produced by FCS 12 enables the charging limit of traction battery 14 to be met and the electrical power production process does not increase byproduct water generation. The additional waste heat enables FCS 12 to be heated faster and more adequately.

However, during low air stoic operation, the stack voltage becomes sensitive to the air stoic. The stack voltage sensitivity to the air stoic during low air stoic operation in conjunction with the constraint imposed by ice formation during freeze startup requires the proposed freeze startup strategy to be designed to stabilize and prevent the stack voltage from falling below the low-side voltage limit of DC/DC converter 32. In this regard, the proposed freeze startup strategy implements a stack voltage control via coordinated power and air path adaptations as detailed below.

Of course, there are other control measures that contribute to a successful freeze startup of FCS 12, including i) freeze preparation drying to eliminate the water content inside the fuel cell stack before the cold soak, ii) tuned anode control for maintaining higher hydrogen density to prevent hydrogen starvation, iii) tuned coolant control to preserve heat inside the fuel cell stack during initial phase of the freeze startup, iv) bringing the traction battery to a state of optimal charge acceptance before shutdown, v) running the compressor at a higher than usual speed to create compression heat, and vi) bypassing the air cooler to maintain gas temperature going into the cathode manifold. These other control measures can be done independently of the proposed freeze startup strategy.

Figure 3:
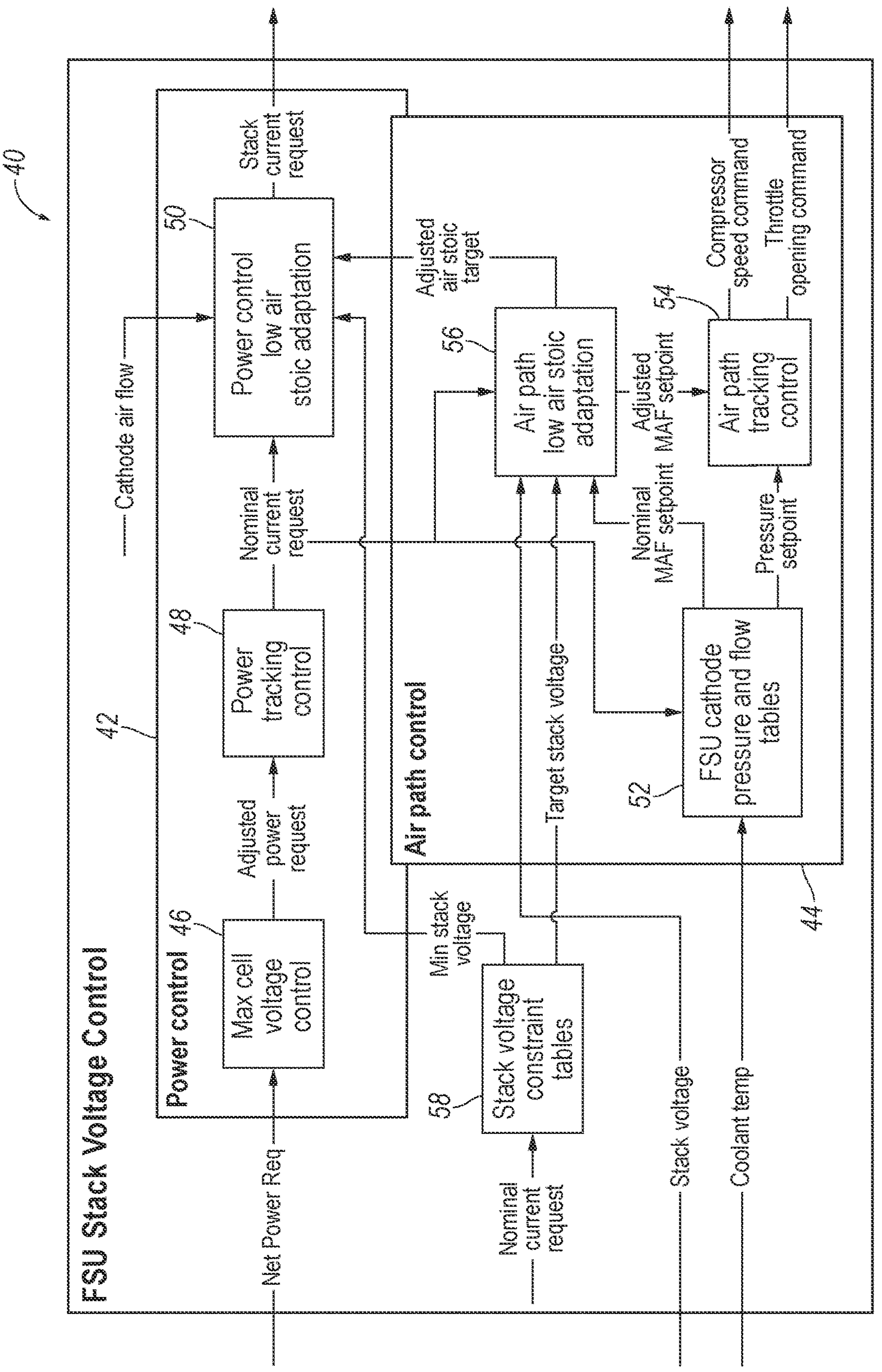
FIG. 3 illustrates a block diagram depicting a processing arrangement of a controller of the FCEV for implementing a stack voltage control based freeze startup strategy for the FCS.

Referring now to FIG. 3, with continual reference to FIGS. 1 and 2, a block diagram depicting a processing arrangement 40 of controller 30 for implementing the proposed freeze startup strategy for FCS 12 is shown. Controller 30 implements the stack voltage control via coordinated power and air path adaptations. The block diagram shown in FIG. 3 highlights inputs and outputs of processing arrangement 40 to coordinate the power and air path controls during the freeze startup of FCS 12 pursuant to the proposed freeze startup strategy.

The proposed freeze startup strategy is implemented by controller 30 for a freeze startup of FCS 12. In this regard, as shown in FIG. 3, processing arrangement 40 of controller 30 includes a "power control" processor 42 and an "air path control" processor 44. Power control processor 42 includes a "max cell voltage control" sub-processor 46, a "power tracking control" sub-processor 48, and a "power control low air stoic adaptation" sub-processor 50. Air path control processor 44 includes a "FSU cathode pressure and flow tables" memory 52, an "air path tracking control" sub-processor 54, and an "air path low air stoic adaptation" sub-processor 56. Controller 30 further includes a "stack voltage constraint tables" memory 58.

The low air stoic power control and air path adaptation sub-processors 50 and 56 are two control logics of the proposed freeze startup strategy for handling the stack voltage control during the freeze startup of FCS 12. The low air stoic power control and air path adaptations rely on the three other control logics (max cell voltage control and power tracking control sub-processors 46 and 48 of power control processor 42; and air path tracking control sub-processor 54 of air path control processor 44) to coordinate throughout the entire freeze startup process.

A principle of the proposed freeze startup stack voltage control is to modify the nominal current request $$(I_{st}^{norm})$$

and the nominal MAF setpoint $$(W_{air,sp}^{norm})$$

to meet the adjusted air stoic target $$(\lambda_{stoic}^{adj}),$$

which is adapted based on the deviation of the stack voltage from its target according to the following equation:

$$\lambda_{stoic}^{adj}(k+1) = \lambda_{stoic}^{adj}(k) + \alpha_{stoic}^{adpt} * \left(v_{st}^{targ}(k) - v_{st}(k)\right) \quad (4)$$

$$\alpha_{stoic}^{adpt} \geq 0$$

represents the adaptation gain for the adjusted air stoic target and $$v_{st}^{targ}$$

represents the target stack voltage as an output from the stack voltage constraint tables of sub-processor 58. While the minimum stack voltage $$(v_{st}^{min})$$

is defining the low voltage limit of DC/DC converter 32, $$v_{st}^{targ} > v_{st}^{min}$$

is calibrated versus $$I_{st}^{norm}$$

during freeze startup to define the desired operating point, which provides the best trade-off in terms of system efficiency, freeze startup time, and operation stability.

Next, based on the adjusted air stoic target, the adjusted stack current $$(I_{st}^{adj})$$

and the adjusted MAF setpoint $$(W_{air,sp}^{adj})$$

can be calculated based on Equation (1) as follows:

$$I_{st}^{adj} = \left(W_{air}^{in} * X_{O_2} * 4F\right) / \left(\lambda_{stoic}^{adj,curr} * N_{cell} * M_{O_2}\right) \quad (5)$$

$$W_{air,sp}^{adj} = \left(I_{st}^{norm} * \lambda_{stoic}^{adj,flow} * N_{cell} * M_{O_2}\right) / \left(X_{O_2} * 4F\right) \quad (6)$$

$$\lambda_{stoic}^{adj,curr} \text{ and } \lambda_{stoic}^{adj,flow}$$

are designed to be different saturated values based on $$\lambda_{stoic}^{adj}.$$

For example, when $$\lambda_{stoic}^{adj,flow} \in [1, 1.5], = \lambda_{stoic}^{adj,curr} \in [1, 2], \text{ and } 1 < \lambda_{stoic}^{adj} < 1.5,$$
$$\lambda_{stoic}^{adj,flow} = \lambda_{stoic}^{adj,curr} = \lambda_{stoic}^{adj} \text{ and } I_{st}^{adj} \text{ follows } I_{st}^{norm}$$

at steady state. Then, when $$\lambda_{stoic}^{adj} > 1.5, \lambda_{stoic}^{adj,flow}$$

is saturated at 1.5 and air flow setpoint $$\left(W_{air,sp}^{adj}\right)$$

will not increase further according to $$\lambda_{stoic}^{adj}$$

because in such condition, the voltage dropping below the target is probably due to icing rather than insufficient air flow. Therefore, to keep away from potential stack voltage brownout, $$\lambda_{stoic}^{adj,curr}$$

still increases to further manage $$I_{st}^{adj}.$$

When the icing condition inside the fuel cell stack is not severely hindering the electrochemical reaction, managing the average air stoic ($\lambda_{stoic}$) as described above is enough to stabilize the stack voltage around its target. However, as icing condition may deteriorate during freeze startup of FCS 12, there is the chance that even when the $\lambda_{stoic}$ ratio is high enough the stack voltage will still dip and fall below $$v_{st}^{min}$$

whereby the freeze startup stalls. To ensure robust freeze startups, prior to the stack current request $$(I_{st}^{rq})$$

being sent out to command the stack current draw, it takes the arbitration according to the following equations:

$$\text{if } v_{st} \geq v_{st}^{min} + v_{hyst}^{dn}, \text{ then} \tag{7A}$$
$$I_{st}^{rq}(k+1) = I_{st}^{adj}(k)$$

-continued $$\text{if } v_{st} < v_{st}^{min} + v_{hyst}^{dn}, \text{ then} \tag{7B}$$
$$I_{st}^{rq}(k+q) = I_{st}^{rq}(k) + \alpha_{curr}^{adpt}\left(v_{st} - v_{st}^{min} - v_{hyst}^{up}\right)$$
$$\text{and hold until } v_{st} > v_{st}^{min} + v_{hyst}^{up}$$

$$\alpha_{curr}^{adpt} \geq 0$$

is the stack current adaptation gain to further reduce the stack current when the stack voltage is too low; and $$v_{hyst}^{up} > v_{hyst}^{dn} > 0$$

specify the hysteresis bounds for $$v_{st}^{min}.$$

When the current adaptation is enabled as shown in Equation (7B), the air stoic adaptation shown in Equation (4) is halted. When $v_{st}$ is successfully stabilized to be higher than $$\left(v_{st}^{min} + v_{hyst}^{up}\right), \lambda_{stoic}^{adj}$$

is reinitialized and the process returns to the air stoic adjustment based on Equation (4). During the transition, a ramp limit may be applied to minimize jittering in $$I_{st}^{rq}.$$

Figure 4:
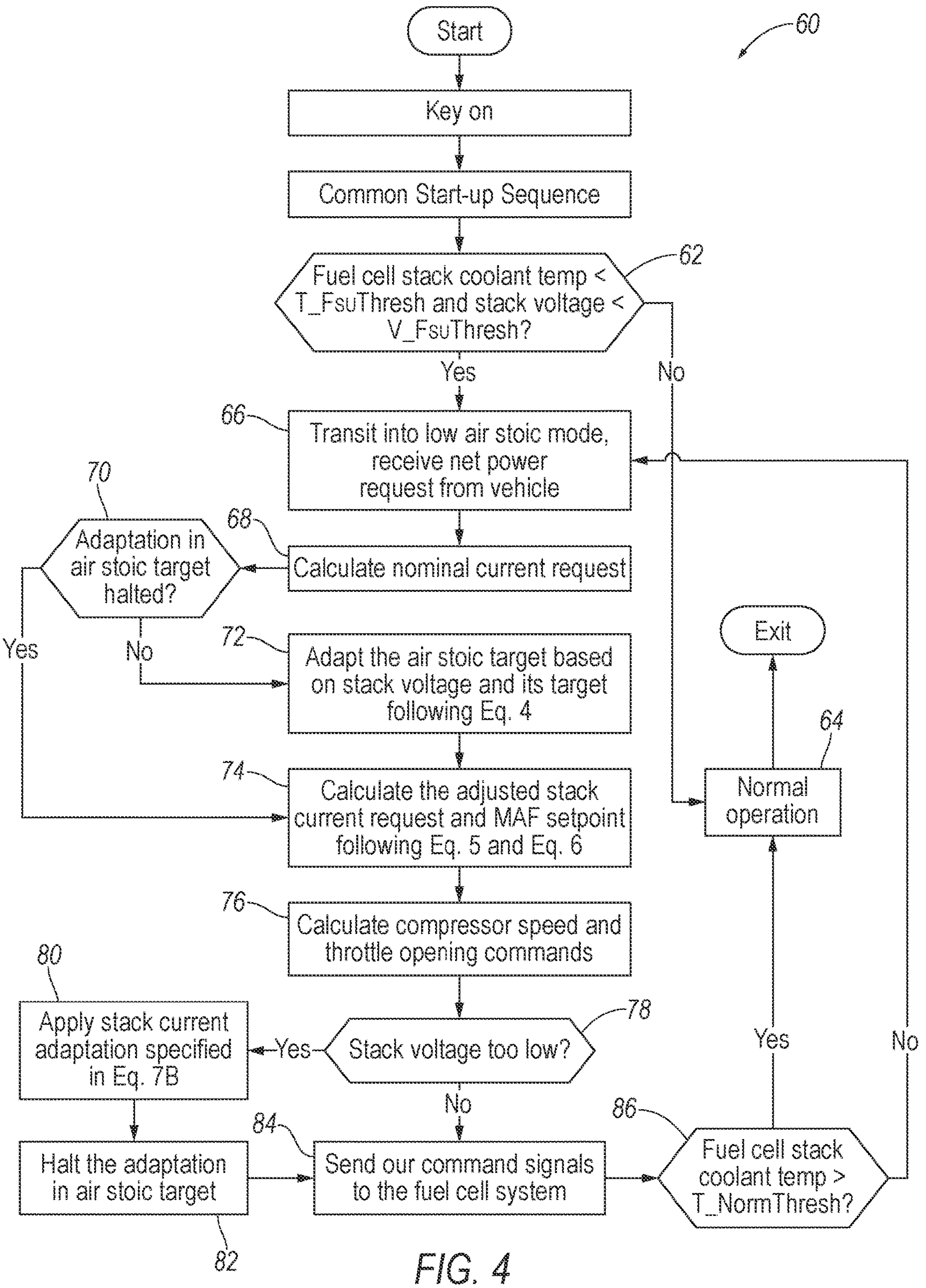
FIG. 4 illustrates a flowchart depicting operation involving the stack voltage control based freeze startup strategy.

Referring now to FIG. 4, with continual reference to FIGS. 1, 2, and 3, a flowchart 60 depicting operation involving the proposed freeze startup strategy is shown. As noted, the operation involving the proposed freeze startup strategy is carried out by controller 30 for starting up FCS 12 during cold conditions.

Initially, note that the adjusted air stoic target $$\left(\lambda_{stoic}^{adj}\right)$$

from Equation (4) is initialized using Equation (1), that is based on the operating condition upon entering low air stoic mode. The low air stoic mode is specified by coolant temperature and stack voltage being lower than their corresponding freeze startup thresholds. Also note that the limits used in the proposed freeze startup strategy such as the $$1 < \lambda_{stoic}^{adj} < 1.5,$$

the adaptation gains $$\left(\alpha_{curr}^{adpt}, \alpha_{stoic}^{adpt}\right),$$

and various thresholds shown in flowchart 60 are subject to tunings for robust performance on different hardware designs.

The operation involving the proposed freeze startup strategy begins with controller 30 detecting whether FCS 12 is cold, as indicated by decision block 62. For instance, as shown in decision block 62, FCS 12 is considered to be cold while the coolant temperature for the FCS is lower than a temperature threshold. Per decision block 62, controller 30 further detects whether the stack voltage of FCS 12 is lower than a voltage freeze startup threshold. When neither of these conditions are true, controller 30 operates FCS 12 per conventional operation, as indicated by process block 64.

When FCS 12 is cold and the stack voltage of the FCS is lower than the voltage freeze startup threshold, controller 30 transits into the low air stoic mode, as indicated by process block 66. In turn, in response to receiving a net power request for FCS 12 to output such as for propelling FCEV 10, controller 30 calculates a commensurate nominal stack current request as indicated by process block 68.

Controller 30 then checks to determine, as explained above, whether the adaptation in the air stoic target should be halted, as indicated by decision block 70. On the one hand, while the adaptation in the air stoic target is to proceed, controller 30 adapts the air stoic target based on the actual stack voltage and targeted stack voltage following Equation (4), as indicated by process block 72. On the one hand, while the adaptation in the air stoic target is to be halted, controller 30 skips on adapting the air stoic target (i.e., the operation of process block 72 is not performed). Controller 30 then calculates the adjusted stack current request and MAF setpoint following Equations (5) and (6), as indicated by process block 74. Controller 30 then calculates the compressor speed and throttle opening commands, as indicated by process block 76.

Controller 30 then checks whether the stack voltage is too low (e.g., lower than the low-side voltage limit of DC/DC converter 32), as indicated by decision block 78. On the one hand, while the stack voltage is too low, controller 30 applies the stack current adaptation specified in Equation (7B), as indicated in process block 80, and halts the adaptation in the air stoic target, as indicated in process block 82. Halting the adaptation in the air stoic target per process block 82 encompasses not only halting the adjustment in the stack current in observance of the stack voltage being too low but also encompasses reducing the stack current in such condition to jump out of the low air stoic operation in order to at least prevent the stack voltage from becoming lower. On the other hand, while the stack voltage is not too low, controller 30 sends out the compressor speed and throttle opening commands to FCS 12, as indicated by process block 84.

Controller 30 then checks whether FCS 12 is still cold, as indicated by decision block 86. On the one hand, upon FCS 12 not being cold anymore (i.e., upon the FCS having been warmed up sufficiently during the proposed freeze startup strategy), controller 30 operates FCS 12 per conventional operation, as indicated by process block 64. On the other hand, while FCS 12 is still cold, controller 30 continues with the proposed freeze startup strategy by repeating the operation starting with process block 66.

Figure 5:
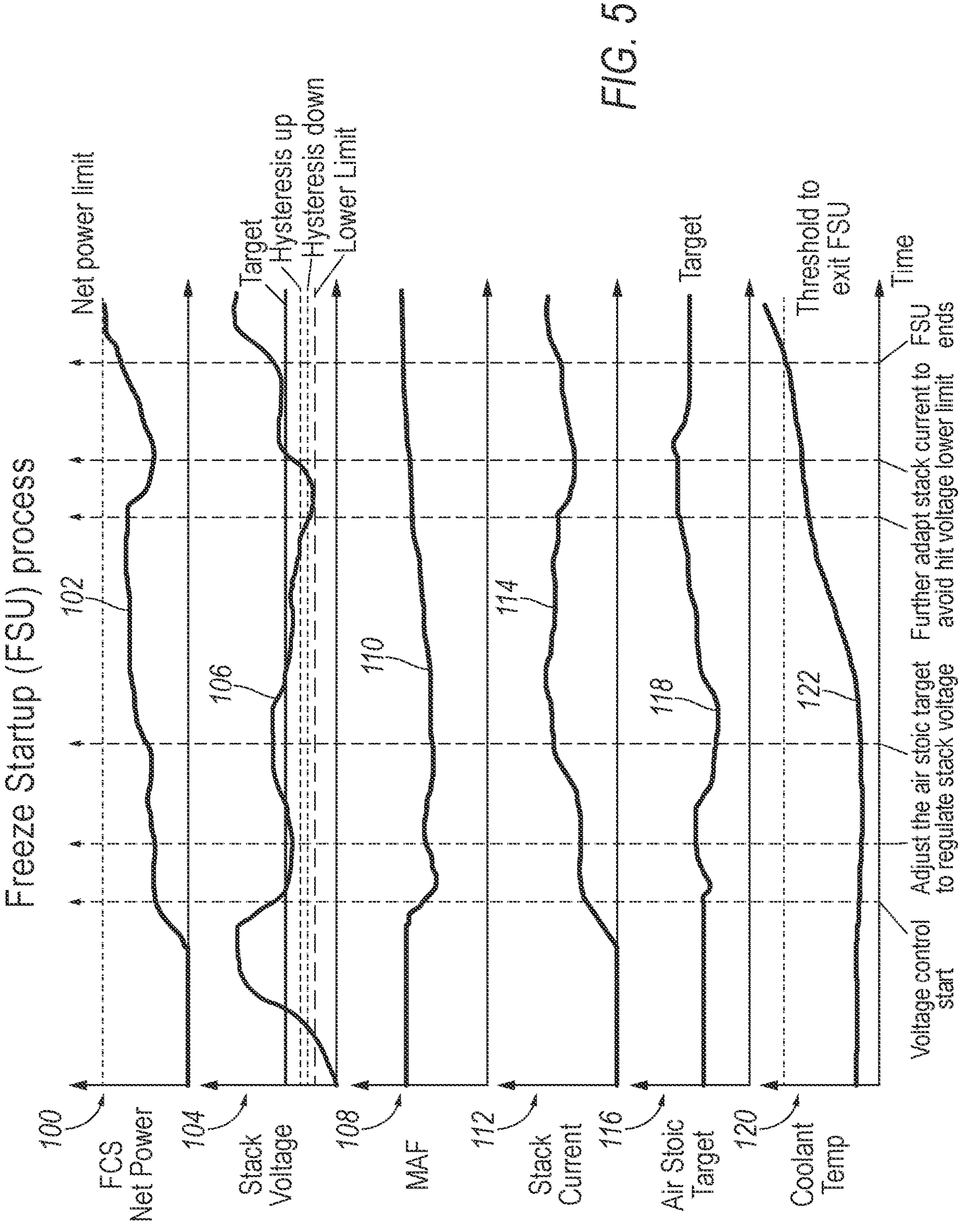
FIG. 5 illustrates graphs of exemplary results of the stack voltage control based freeze startup strategy for the FCS, the graphs including a first graph having a plot of a net electrical power provided by the FCS versus time, a second graph having a plot of the stack voltage of the FCS versus time, a third graph having a plot of a mass air flow (MAF) into the FCS versus time, a fourth graph having a plot of a stack current of the FCS versus time, a fifth graph having a plot of an air stoic target for the FCS versus time, and a sixth graph having a plot of a coolant temperature associated with the FCS versus time.

Referring now to FIG. 5, graphs of exemplary results of the proposed freeze startup strategy for FCS 12 are shown. Initially, note that the constant limits for power and stack voltage are used for illustration purposes. In practice, these limits can be time-varying through tunable calibrations to meet operational requirements.

The graphs shown in FIG. 5 include a first graph 100 having a plot 102 of the net electrical power provided by FCS 12; a second graph 104 having a plot 106 of the stack voltage of the FCS versus time; a third graph 108 having a plot 110 of the mass air flow (MAF) into the FCS versus time; a fourth graph 112 having a plot 114 of the stack current of the FCS versus time; a fifth graph 116 having a plot 118 of the air stoic target for the FCS versus time; and a sixth graph 120 having a plot 122 of the coolant temperature associated with the FCS versus time.

As described, embodiments of the present disclosure provide a control strategy to robustly handle the unassisted freeze startup for a fuel cell system of a vehicle at cold ambient.

While exemplary embodiments are described above, it is not intended that these embodiments describe all possible forms of the present disclosure. Rather, the words used in the specification are words of description rather than limitation, and it is understood that various changes may be made without departing from the spirit and scope of the present disclosure. Additionally, the features of various implementing embodiments may be combined to form further embodiments of the present disclosure.

What is claimed is:

1. A system comprising:

a fuel cell stack; and a controller configured to operate the stack with a given air stoic ratio while a temperature of the stack is greater than a temperature threshold and, while the temperature of the stack is lower than the temperature threshold, adapt a lower air stoic ratio, that is lower than the given air stoic ratio, according to a difference between a stack voltage of the stack and a desired stack voltage, as the stack voltage of the stack changes, and operate the stack with the adapted lower air stoic ratio, to suppress the stack voltage of the stack toward the desired stack voltage in order to thereby increase heat generation of the stack.

2. The system of claim 1 wherein:

the controller is further configured to adjust a stack current of the stack in order to operate the stack with the adapted lower air stoic ratio.

3. The system of claim 1 wherein:

the controller is further configured to adjust a stack current of the stack in order to operate the stack with an air stoic ratio greater than the adapted lower air stoic ratio while the stack voltage is lower than a voltage threshold.

4. The system of claim 3 wherein:

the voltage threshold is a low-side voltage limit of a DC/DC converter configured to receive the stack voltage from the stack.

5. The system of claim 1 wherein:

the controller is further configured to adjust a mass air flow into the stack in order to operate the stack with the adapted lower air stoic ratio.

6. The system of claim 1 wherein:

the controller is further configured to operate the stack with the adapted lower air stoic ratio while the temperature of the stack is lower than the temperature threshold and while the stack voltage of the stack is lower than a freeze voltage threshold.

7. The system of claim 1 wherein:

the given air stoic ratio is at least 1.75 and the adapted lower air stoic ratio is less than 1.5.

8. The system of claim 1 wherein:

the adapted lower air stoic ratio is less than 1.5 and is greater than 1.0.

9. A vehicle comprising:

a fuel cell stack; and a controller configured to, while a temperature of the fuel cell stack is less than a temperature threshold, adapt an air stoic ratio, that is lower than an air stoic ratio used to operate the fuel cell stack when the temperature is greater than the temperature threshold, according to a difference between a stack voltage of the fuel cell stack and a desired stack voltage, as the stack voltage of the fuel cell stack changes, and operate the fuel cell stack with the adapted air stoic ratio suppress the stack voltage of the fuel cell stack toward the desired stack voltage in order to thereby increase heat generation of the fuel cell stack.

10. The vehicle of claim 9 wherein:

the controller is further configured to adjust a stack current of the fuel cell stack in order to operate the fuel cell stack with the adapted air stoic ratio.

11. The vehicle of claim 9 further comprising:

a DC/DC converter configured to receive the stack voltage from the fuel cell stack; and wherein the controller is configured to adjust a stack current of the fuel cell stack in order to operate the fuel cell stack with an air stoic ratio greater than the adapted air stoic ratio while the stack voltage is lower than a low-side voltage limit of the DC/DC converter.

12. The vehicle of claim 9 wherein:

the controller is further configured to adjust a mass air flow into the fuel cell stack in order to operate the fuel cell stack with the adapted air stoic ratio.

13. The vehicle of claim 9 further comprising:

a traction battery configured to provide a battery electrical power for vehicle propulsion; and wherein the fuel cell stack is configured to provide a fuel cell stack electrical power dependent on the stack voltage of the fuel cell stack for vehicle propulsion.

14. The vehicle of claim 9 wherein:

the adapted air stoic ratio is less than 1.5 and is greater than 1.0.

15. A method for a vehicle having a fuel cell system, the method comprising:

operating the fuel cell stack with a given air stoic ratio while a temperature of the fuel cell stack is greater than a temperature threshold; and while the temperature of the fuel cell stack is lower than the temperature threshold, adapting a lower air stoic ratio, that is lower than the given air stoic ratio, according to a difference between a stack voltage of the fuel cell stack and a desired stack voltage, as the stack voltage of the fuel cell stack changes, and operating the fuel cell stack with the adapted lower air stoic ratio, to thereby to suppress the stack voltage of the fuel cell stack toward the desired stack voltage in order to thereby increase heat generation of the fuel cell stack.

16. The method of claim 15 further comprising:

adjusting a stack current of the fuel cell stack in order to operate the fuel cell stack with the adapted lower air stoic ratio.

17. The method of claim 15 further comprising:

adjusting a mass air flow into the fuel cell stack in order to operate the fuel cell stack with the adapted lower air stoic ratio.

* * * * *